United States Patent [19]
Dresbach

[11] 3,898,995
[45] Aug. 12, 1975

[54] NONCOMPETITIVE PACEMAKER WITH PROGRAMMABLE UNIJUNCTION TRANSISTORS

[76] Inventor: James Bernard Dresbach, 16885 Muirland, Detroit, Mich. 48221

[22] Filed: Mar. 25, 1974

[21] Appl. No.: 454,608

[52] U.S. Cl. .................. 128/419 PG; 307/252 F
[51] Int. Cl. ............................................. A61n 1/36
[58] Field of Search.......... 128/419 PG, 419 R, 421, 128/422, 423; 307/252 F; 331/113 S

[56] References Cited
UNITED STATES PATENTS

| | | | |
|---|---|---|---|
| 3,603,946 | 9/1971 | Lee................................. | 307/252 F |
| 3,644,918 | 2/1972 | Perlman .......................... | 307/252 F |
| 3,661,157 | 5/1972 | Fyson et al. .................... | 128/419 PG |
| 3,679,912 | 7/1972 | Tenenbaum..................... | 307/252 F |
| 3,807,410 | 4/1974 | Wall et al. ...................... | 128/419 PG |

*Primary Examiner*—William E. Kamm
*Attorney, Agent, or Firm*—Edmund M. Chung; Leonard C. Brenner; Manuel Quiogue

[57] ABSTRACT

A noncompetitive pacemaker connects to an organ which is to be electrically stimulated. A pair of programmable unijunction transistors are employed to detect the presence and absence of natural heartbeats so that the output of the pacemaker is modified each time a natural heartbeat is detected.

1 Claim, 1 Drawing Figure

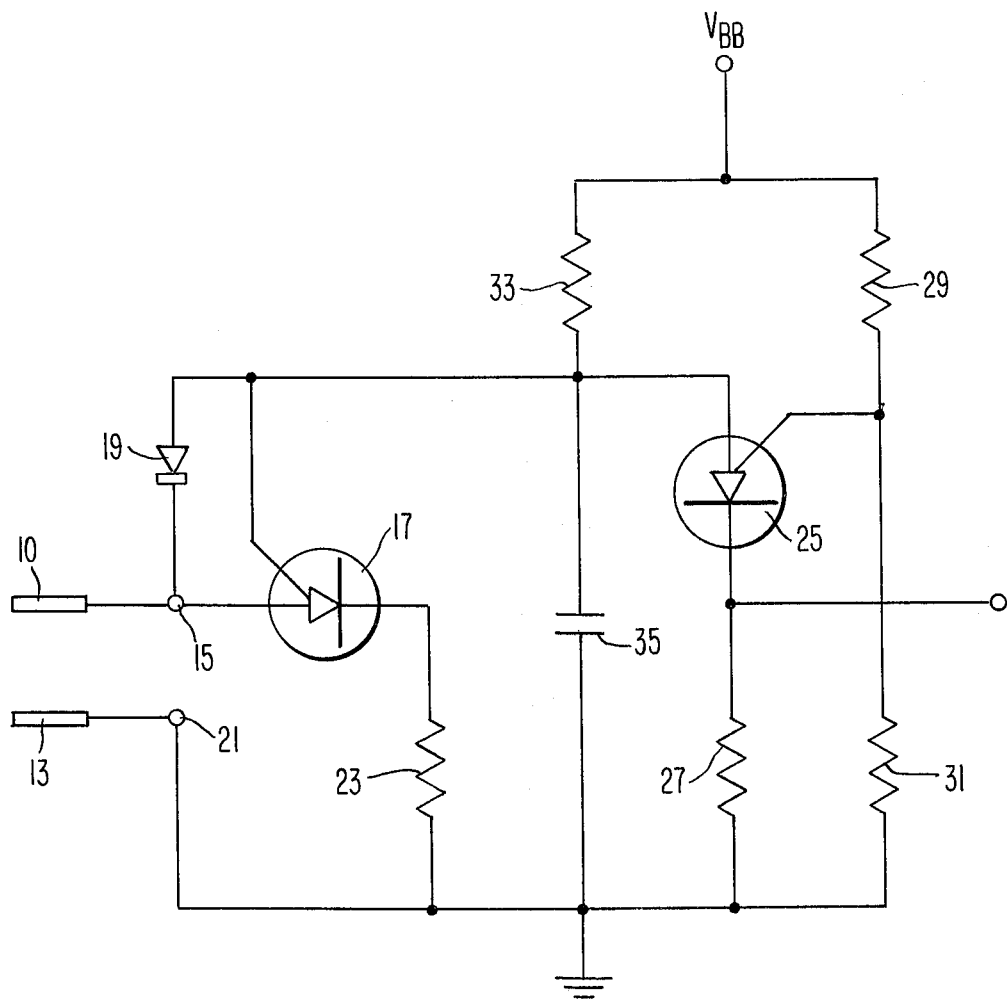

NONCOMPETITIVE PACEMAKER WITH PROGRAMMABLE UNIJUNCTION TRANSISTORS

FIELD OF THE INVENTION

This invention relates to cardiac pacers, and more particularly to a demand pacer employing programmable unijunction transistors (PUT).

BACKGROUND OF THE INVENTION

Cardiac pacemaker activity is subject to interference from a variety of electrical and radio frequency fields. For instance, radio frequency (RF) transmissions such as radio and television broadcasting; RF energy from miscellaneous sources such as microwave ovens and radar; carrier current on power transmission lines; magnetic fields around power transformers and conductors carrying electric current; and arcing and sparking electrical equipment such as power tools, commutator motors, and ignition systems of aircraft, automobile, motorcycle, and lawnmowers have been known to interfere with normal pacemaker operation. In addition, electrocautery, neurosurgical stimulators, and high-voltage radiation therapy units, are common sources of electrical interference within a hospital. When cardiac stimulators are employed in subjects which have certain types of defects in the conduction system of their hearts, it is important to be able to distinguish between natural and control stimulating potentials and artificial stimulating pulses so that if the former is present the latter will not compete with it and cause a functional irregularity in the heart.

In an attempt to minimize the possibility of competition, noncompetitive type pacemakers have been developed. These pacemakers monitor spontaneous cardiac activity and possess a sensing circuit capable of detecting the atrial or ventricular activity of the heart arising spontaneously. Noncompetitive pacemakers of the prior art contained electronic circuitry to sense electrical cardiac activity and to modify the output of the pacemaker should a natural electrical signal occur within a prescribed timing interval. Such pacemakers of the prior art, however, have the inherent risk that they may detect electrical activity from sources apart from the heart, and their behavior may be modified by electrical interference.

While noncompetitive pacemakers of the prior art are very susceptible to electrical interference when tested externally, once implanted in the patient, the pacemaker is shielded by the body from most of the recognized electrical interferences. Nevertheless, with the increasing use of noncompetitive pacemakers, which depend for their function upon detection of the intracardiac electrical activity, the problems of interference still pose a serious problem.

Recognizing that the number and variety of potential interfering sources are too great and the benefits derived from these ordinarily biologically harmless electric and radio frequency fields have become too much a part of our modern technology and way of life to make elimination desirable or even possible, noncompetitive pacemakers of the prior art were designed to shield out external interferences. Irrespective, prior art noncompetitive pacemakers are still shielded only to the extent that the shield itself is effective against the various possible interfering sources.

It is therefore an object of this invention to provide a noncompetitive pacemaker which is not susceptible to extraneous electromagnetic influences.

It is another object of this invention to provide a noncompetitive pacemaker which is economical and simple in construction.

SUMMARY OF THE INVENTION

In accordance with the principles of the instant invention, programmable unijunction transistors (PUT) are employed to detect natural heart pulses and to generate stimulating pulses in the absences of natural heart pulses. Since the PUT, which is well-known in the art, is essentially a semiconductor bar with three junctions, it is comparatively inert to possible electromagnetic interference as opposed to other components presently used in the art. In addition, the PUT requires considerably less power consumption, and is comparatively less expensive than its equivalent counterparts. In the instant invention, a first PUT is employed to sense natural heartbeats and to provide a first discharge path for a charged capacitor each time a natural heartbeat is detected. A second PUT is employed to provide a stimulation pulse each time the first PUT does not detect a natural heartbeat, by providing a second discharge path for the charged capacitor.

Further objects, features and advantages of the instant invention will become apparent upon consideration of the following description in conjunction with the drawing in which:

The FIGURE is a circuit diagram of a noncompetitive pacemaker according to the instant invention.

In the preferred embodiment, a pair of electrodes 10 and 13 are provided for electrical connection to the heart of an individual requiring a noncompetitive type pacemaker. One of these electrodes, such as electrode 10 is adapted to be directly connected to the heart, as by attachment to the myocardium or which may be an intravenous conductive catheter for stimulating interiorly of the heart. The other electrode, such as the electrode 13, may be connected elsewhere, essentially at any convenient location in the body that will serve as a return. For convenience, and not to indicate any necessary circuit conditions, the electrode 13 has been indicated as at a reference of ground.

The electrodes 10 and 13 may serve the dual purpose of delivering artificial pacing pulses to the heart and detecting the presence of natural heart potentials, although separate electrodes could be used for these purposes.

In the preferred embodiment, electrode 10 is connected to a terminal 15, which in turn is connected to the anode terminal of a first programmable unijunction transistor (PUT) 17. The gate terminal of PUT 17 is also connected via a diode 19 to the anode terminal of PUT 17 such that the anode of diode 19 is connected to the gate terminal of PUT 17. The cathode terminal of PUT 17 is connected via a resistor 23 to a terminal 21, to which is also connected the electrode 13. Briefly, the function of PUT 17 and its related circuitry, which will be described in greater detail later, is to sense the electrical activity of the heart, i.e., the P, Q, R, S and T waves in an electrocardiogram trace, and to provide a first discharge path for a capacitor 35 each time a natural heartbeat is sensed.

To provide the necessary stimulating potential in the event the heart fails to provide the natural heartbeat(s), a second programmable unijunction transistor PUT 25 is employed. The anode terminal of PUT 25 is connected to the gate terminal of PUT 17, while the cathode terminal of PUT 25 is connected to terminal 21 via a resistor 27. The gate terminal of PUT 25 is connected via a resistor 29 to a source of potential $V_{BB}$, and connected via a resistor 31 to the terminal 21. Resistors 29 and 31 form a voltage dividing network, the function of which will be described in greater detail later. A series RC circuit comprising a resistor 33 and the capacitor 35 is connected between the voltage source $V_{BB}$ and the terminal 21. To provide a second discharge path for the capacitor 35, the anode terminal of PUT 25 is connected to the junction formed by resistor 33 and capacitor 35, the gate terminal of PUT 17 is also connected to this junction. With this arrangement, resistor 33 provides a charging resistance for capacitor 35, while resistor 27 provides a discharging resistance for capacitor 35. Output signals, therefore, are obtained from the cathode terminal of PUT 25. Thus, if electrode 10 is to serve both as a sensing and stimulating electrode, the cathode of PUT 25 is connected to terminal 15. In essence, PUT 25, resistor 33 and capacitor 35 form a relaxation oscillator which is inoperative so long as natural heartbeats are of sufficient strength and regularity.

Having now described the construction of the instant invention, its operation will next be described. As mentioned earlier, the naturally occuring heart wave is conventionally divided into P, Q, R, S and T waves for purposes of description and analysis. Among these, atrial (P wave) and ventricular (QRS-waves) signals associated with natural stimulation of the heart are examples of rather high potential signals. Typically, the atrial stimulating pulse has a duration of two milliseconds, while ventricular activity typically has a duration of 80 milliseconds. In addition, an interval of approximately 120–160 milliseconds elapses between atrial and ventricular stimulation. While the above time periods are not universal, they are reasonable for purposes of further discussion.

Generally, a pacer of the noncompetitive type is primed to generate an impulse at a predetermined time after the last natural heartbeat. If another natural heartbeat occurs within the predetermined time interval of the pacer, an impulse is not generated, and the predetermined time period begins again. However, if a natural heartbeat does not occur within the predetermined time interval a stimulating impulse is generated. The largest magnitude electrical signal generated by the heart activity is the QRS complex corresponding to ventricular contraction. Thus, in the preferred embodiment, PUT 17 is designed to provide a discharge path via resistor 23 for capacitor 35 so long as natural heartbeat signals are received by electrode 10. On the other hand, PUT 25 is designed to provide a discharge path for capacitor 35 whenever a natural heartbeat does not occur.

The combination of resistor 33 and capacitor 35 control or regulate the rate of pacing the heart. In selecting the appropriate value for capacitor 35, consideration should be given to the fact the capacitor must be capable of transferring the minimum amount of energy required for consistent cardiac contraction. Moreover, consideration must be given to the fact that the impedance of the heart is constantly changing. However, after selecting a value for capacitor 35, the value of resistors 33 and 27 are rather easy to determine, due consideration being given to the characteristics of PUT 25 and the appropriate time periods of the appropriate cardiac waves. The values of resistors 29 and 31 are selected so as to bias the gate of PUT 25 such that PUT 25 is non-conducting until the potential on the anode terminal of PUT 25 coincides with the charge on capacitor 35 at time T, where T is the time of the duration of the predetermined period.

Thus, as long as a natural heartbeat is sensed by electrode 10, PUT 17 will provide a discharge path for capacitor 35. When a natural heartbeat does not occur, capacitor 35 will charge through resistor 33 until the potential appearing at the anode terminal of PUT 25 is sufficient to turn PUT 25 on. Capacitor 35 then discharges through PUT 25 and discharge resistor 27, resulting in a stimulating pulse appearing at terminal 21. Diode 19 helps bias PUT 17 just below its threshold point so that when a natural heartbeat reaches the anode terminal of PUT 17, PUT 17 will be turned on, thereby allowing capacitor 35 to discharge through resistor 23 before capacitor 35 is charged sufficiently to trigger PUT 25 and pulse the heart artificially.

A feature of PUT 25 is that typically, only a very small differential (i.e., 0.3 volts) between anode and gate potentials is required to trigger PUT 25 into conduction. Thus, the values of resistors 29 and 31 can be easily determined so as to bias the gate of PUT 25 at a potential approximately 0.3 volts less than charge on capacitor 35 at time T, which is the predetermined time duration which must elapse before the pacer stimulates the heart. Moreover, because of the characteristics of PUT 25 and its operation in the circuit of the instant invention, only a negligible current is required, thereby reducing power comsumption considerably and extending the life of the battery source of the pacemaker substantially.

Except for the electrodes 10 and 13, the other circuit elements shown can be encapsulated in solid epoxy resin and coated with a body compatible silicone moisture barrier so that the device may be implanted in the body. Alternatively, the pacemaker may also be situated outside of the body, in which case an intravenous conductive catheter leading to the heart may provide stimulating pulses and also detect any signals on the heart.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A noncompetitive pacemaker including a capacitor for providing stimulation pulses to the heart comprising:

means for charging said capacitor to a potential V;

means for receiving signals corresponding to intracardiac activity; said receiving means including a first and second electrode; said first and second electrode being suitable for connection to the heart;

a first path for discharging said capacitor before said capacitor is charged by said charging means to said potential V; said first path including a first programmable unijunction transistor and a first resistor; said first programmable unijunction transistor having an anode, a cathode and a gate; said anode of said first programmable unijunction transistor being connected to said first electrode; said first resistor and said capacitor forming a series circuit connected between said gate and said cathode of said first programmable transistor; and a second path for discharging said capacitor when said capacitor is charged by said charging means to said potential V; said second path including a second programmable unijunction transistor and a second resistor, said second programmable unijunction transistor having an anode, a cathode and a gate; said cathode of said second programmable unijunction transistor being connected to said first electrode; said second resistor and said capacitor forming a series circuit connected between said anode and said cathode of said second programmable unijunction transistor; said gate of said second programmable unijunction transistor being coupled to said potential V;

said second electrode and said first and second paths having a common connection.

\* \* \* \* \*